Nov. 18, 1924.
W. H. GROWALL
TEMPERATURE AND WATER INDICATOR
Filed July 23, 1923
1,516,427
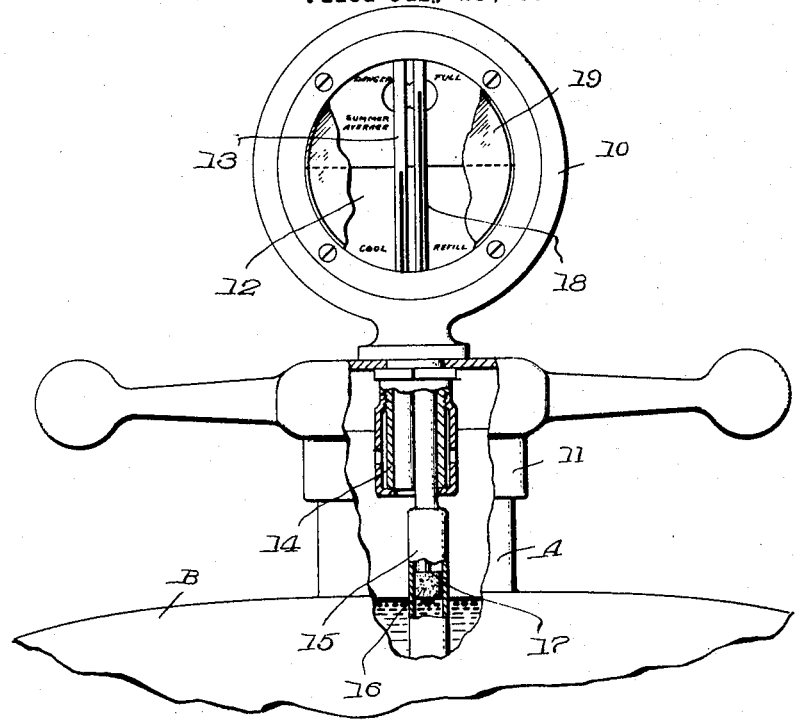
Fig. 1.
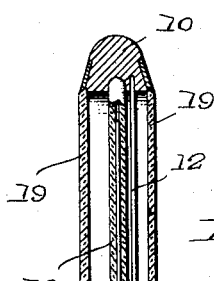
Fig. 2.
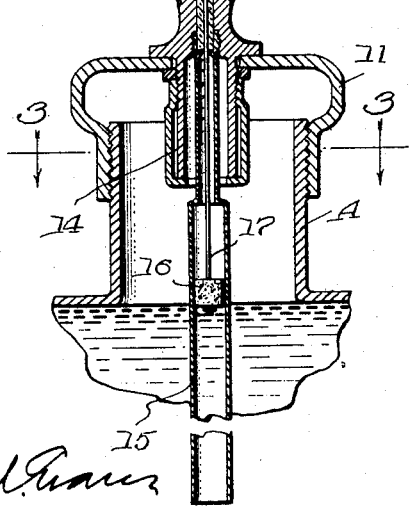
Fig. 3.
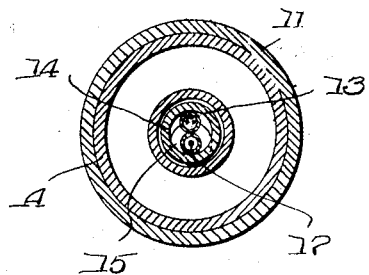
W. H. Growall
INVENTOR
BY Victor J. Evans
ATTORNEY
WITNESS:

Patented Nov. 18, 1924.

1,516,427

UNITED STATES PATENT OFFICE.

WILLIAM H. GROWALL, OF GARRETT, PENNSYLVANIA.

TEMPERATURE AND WATER INDICATOR.

Application filed July 23, 1923. Serial No. 653,365.

*To all whom it may concern:*

Be it known that I, WILLIAM H. GROWALL, a citizen of the United States, residing at Garrett, in the county of Somerset and State of Pennsylvania, have invented new and useful Improvements in Temperature and Water Indicators, of which the following is a specification.

This invention relates to indicating devices for use upon the radiators of automobiles and has for its object the provision of a novel device which is designed to be mounted upon the filling neck of a radiator to replace the ordinary cap and which will operate to indicate an excessively high temperature of the water and also the level thereof, the data in these two respects apprising the operator of the exact condition which exists so that he may determine whether the overheating, if any, is occasioned by lack of water or is caused by some other condition, knowledge of any defective condition operating to prevent injury to the car by driving it with too little water, too little oil or under any other adverse conditions, such as with a slipping fan belt or the like.

An important object is the provision of a device of this character which will be entirely automatic in operation and which on account of involving very few parts will be simple and inexpensive in manufacture, and at the same time neat and attractive in appearance.

With the above and other objects and advantages in view the invention consists in the details of construction to be hereinafter more fully described and claimed and illustrated in the accompanying drawings, in which:

Figure 1 is a front elevation of the device mounted upon a radiator, only a portion of the radiator being shown, Figure 2 is a vertical section and Figure 3 is a cross section.

Referring more particularly to the drawings I have shown my device as comprising a circular ring like body 10 preferably formed integrally upon a cap 11 which is either externally or internally threaded as the case may be for engagement upon the neck A of a radiator B. In some types of cars the neck is externally threaded and in other types the threads are on the inside but this detail as to the formation of the cap 11 is immaterial. One side of the body 10 is covered by a disk or dial 12 which bears any desired indicia such as that to be hereinafter described.

Mounted within the body and secured therein is a thermometer 13 which has its lower end fitting within and protected by a pocket 14 which projects downwardly from substantially the center of the cap. This thermometer need not be graduated in degrees as it is intended to indicate merely, a cool, average or dangerous temperature of the water in the radiator. For this reason the one side of the front of the dial 12 bears the legends "Cool," "Normal" and "Danger," these legends being arranged in series upwardly.

Secured on the underside of the cap and projecting downwardly to a considerable extent is a tube 15 which is open at both ends so as to receive water from the radiator, the level of the water within the tube being the same as the level in the upper tank of the radiator. Movably mounted within this tube is a float 16 carried by a stem 17 which slides through the cap and which is guided within a glass tube 18 which traverses the ring like body 10 in spaced parallel relation to the thermometer 13. The stem 17 is of some conspicuous color contrasting with the color of the liquid in the thermometer tube. In actual practice the liquid in the thermometer, in the case of one of the spirit type would probably be red and blue would therefore be a very suitable color for the rod 17. The dial is provided with the legends "Refill" located at the lower portion, and the legend "Full" located at the top. The end of the stem will be disposed either at these legends or at some point between them, depending upon the level of the water within the radiator. The tubes are protected by a transparent cover 19 suitably mounted on the ring like body, the transparency of this cover permitting the operator to see the height of the column in the thermometer tube and the rod or stem 17 at all times.

In the use of the device it will be seen that the thermometer acts in the same manner as the well known so called motometer in common use, but this particular instrument has the additional advantage of indicating at all times the level of the water within the radiator. If the driver should at any time notice that the temperature is too high or the water level too low he should alight from the car and make a close inspection to ascertain the cause of the trouble. If the water level is too low he may simply need to fill the radiator, but if the temperature is too high and the water level proper, he must locate the other defective condition. The device is of great value for indicating dangerous conditions such as, for instance, a lack of oil, excessive carbon or a slipping fan belt, either of which will be evidenced by over-heating of the water in the radiator. For this reason the device should operate to prevent injury to a motor and consequently prolong its life.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A combined temperature and water level indicator for motor vehicle radiators, comprising the combination with a radiator cap, of a body member having a reduced extension adapted for engagement through an opening in the cap, a nut screwed onto said extension and engaging the underside of the top of the cap, a shell member screwed onto said reduced extension and having its lower end formed with an inwardly extending flange bearing against the lower edge of said extension, an elongated metallic tube located within the extension and connected with the body, the tube having its bottom open and formed at its top with holes for the escape of air, a transparent tube having its lower end mounted within the upper end of the metallic tube, said body having its upper portion formed as an open frame covered at both sides with transparent plates, said glass tube traversing said frame, a float within the metallic tube carried by a stem slidable through the transparent tube and a thermometer carried by the body and having its bulb retained within said shell and its tube traversing the frame in spaced parallel relation to the said transparent tube.

In testimony whereof I affix my signature.

WILLIAM H. GROWALL.